(12) United States Patent
Oh (10) Patent No.: US 11,247,570 B2
(45) Date of Patent: Feb. 15, 2022

(54) APPARATUS FOR CONTROLLING TOWING MODE OF ELECTRIC VEHICLE AND METHOD THEREOF

(71) Applicants: Hyundai Motor Company, Seoul (KR); Kia Motors Corporation, Seoul (KR)

(72) Inventor: Min Gi Oh, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 213 days.

(21) Appl. No.: 16/511,782

(22) Filed: Jul. 15, 2019

(65) Prior Publication Data

US 2020/0290464 A1 Sep. 17, 2020

(30) Foreign Application Priority Data

Mar. 15, 2019 (KR) .................. 10-2019-0029819

(51) Int. Cl.
*B60L 15/20* (2006.01)
*B60L 58/24* (2019.01)
(Continued)

(52) U.S. Cl.
CPC ............. *B60L 15/2045* (2013.01); *B60L 7/10* (2013.01); *B60L 58/24* (2019.02); *B60W 40/076* (2013.01);
(Continued)

(58) Field of Classification Search
CPC ........ B60L 15/2045; B60L 58/24; B60L 7/10; B60L 2240/12; B60L 2240/20; B60L 2240/26; B60L 2240/429; B60L 2260/26; B60L 2260/44; Y02T 10/72; Y02T 10/70; B60W 2710/08; B60W 2510/08;
(Continued)

(56) References Cited

U.S. PATENT DOCUMENTS 9,956,965 B1 * 5/2018 Hall ...................... B60W 50/14
2004/0006421 A1 1/2004 Yanase
(Continued)

FOREIGN PATENT DOCUMENTS

| KR | 101836290 B1 | 4/2018 |
| KR | 20180134066 A | 12/2018 |
| WO | 2009066499 A1 | 5/2009 |

OTHER PUBLICATIONS

European Search Report dated Oct. 24, 2019 in corresponding EP Application No. 19185448.8.

*Primary Examiner* — James M McPherson
*Assistant Examiner* — Kyle J Kingsland
(74) *Attorney, Agent, or Firm* — Mintz Levin Cohn Ferris Glovsky and Popeo, P.C.; Peter F. Corless (57) ABSTRACT

An apparatus for controlling a towing mode of an electric vehicle is provided. The apparatus includes a first sensor that measures a speed of the electric vehicle and a second sensor that measures a gradient of a road on which the electric vehicle is driven. A controller detects a reference output of the electric vehicle based on the speed and the gradient of the road and detects a towing weight of the electric vehicle based on an excess rate of a current output with respect to the reference output. The towing mode of the electric vehicle is then executed based on the detected towing weight.

16 Claims, 7 Drawing Sheets

(51) Int. Cl.
*B60L 7/10* (2006.01)
*B60W 40/13* (2012.01)
*B60W 40/076* (2012.01)

(52) U.S. Cl.
CPC .......... *B60W 40/13* (2013.01); *B60L 2240/12* (2013.01); *B60L 2240/20* (2013.01); *B60L 2240/26* (2013.01); *B60L 2240/429* (2013.01); *B60L 2260/26* (2013.01); *B60L 2260/44* (2013.01); *B60W 2530/10* (2013.01); *B60W 2552/15* (2020.02)

(58) Field of Classification Search
CPC ......... B60W 2552/15; B60W 2530/10; B60W 40/13; B60W 40/076; B60W 30/182
See application file for complete search history.

(56) References Cited

U.S. PATENT DOCUMENTS

| | | | |
|---|---|---|---|
| 2010/0235039 A1* | 9/2010 | Kajigai | B60W 40/02 701/31.4 |
| 2013/0146374 A1 | 6/2013 | Books et al. | |
| 2014/0005879 A1 | 1/2014 | Poechmueller et al. | |
| 2014/0067153 A1 | 3/2014 | Yu | |
| 2014/0262195 A1 | 9/2014 | Lee | |
| 2014/0277867 A1* | 9/2014 | Nedorezov | B60W 10/06 701/22 |
| 2014/0278041 A1 | 9/2014 | Brenninger | |
| 2016/0264144 A1 | 9/2016 | Fontvieille et al. | |
| 2016/0297411 A1* | 10/2016 | Trombley | B60T 7/20 |
| 2017/0297558 A1 | 10/2017 | Afram et al. | |
| 2017/0297563 A1* | 10/2017 | Kava | B60W 10/11 |
| 2018/0001788 A1 | 1/2018 | Geu et al. | |
| 2018/0094721 A1* | 4/2018 | Lee | F16H 59/52 |
| 2018/0128672 A1 | 5/2018 | Park et al. | |
| 2018/0265076 A1* | 9/2018 | Hall | B60W 10/04 |
| 2019/0039595 A1* | 2/2019 | Hawley | B60W 20/30 |
| 2020/0226850 A1* | 7/2020 | Bower | B60L 58/10 |

* cited by examiner

FIG.7

APPARATUS FOR CONTROLLING TOWING MODE OF ELECTRIC VEHICLE AND METHOD THEREOF

CROSS-REFERENCE TO RELATED APPLICATION

This application claims the benefit of priority to Korean Patent Application No. 10-2019-0029819, filed on Mar. 15, 2019, the entire contents of which are incorporated herein by reference.

TECHNICAL FIELD

The present disclosure relates to a technology of controlling a towing mode of an electric vehicle, and more particularly, to an apparatus for controlling a towing mode of an electric vehicle that estimates a towing weight based on a difference between a reference output of the vehicle and a current output of the vehicle corresponding to a speed and a gradient of the vehicle.

BACKGROUND

In general, an electric vehicle includes a vehicle control unit (VCU) connected to a vehicle network, a motor control unit (MCU), a transmission control unit (TCU), a battery management system (BMS), and the like, and drives a motor using the energy of a battery managed by the battery management system. Such an electric vehicle recovers energy by regenerative braking to charge the battery when decelerating or stopping. Since the battery is unable to be stably charged only by the energy recovered by the regenerative braking, the battery must be charged using the commercial power source after the vehicle is driven a particular distance or after the driving of the vehicle is terminated.

The electric vehicle periodically manages the temperature and the state of charge (SOC) of the battery, thereby informing the driver of a distance-to-empty (DTE) based on the remaining capacity of the battery. In recent years, to determine a towing level, a hybrid vehicle also includes an acceleration measurement device configured to measure a longitudinal acceleration of a vehicle, a data detector configured to detect state data to estimate a weight of the vehicle, an engine clutch disposed between an engine and a driving motor to selectively connect the engine and the driving motor, a starting generator connected to the engine to start the engine or generate electricity, and a vehicle controller configured to generate a basic vehicle weight using an engine torque, a motor torque, and the longitudinal acceleration measured by the acceleration measurement device when the state data satisfies an estimated entry condition, and estimate a final vehicle weight using the basic vehicle weight and a weight setting vale. There has been proposed a technology of identifying an estimated variation amount indicating a difference between a basic vehicle weight and a previous vehicle weight when an update condition is met, determining whether the estimated variation amount exceeds a reference variation amount, summing the previous vehicle weight and the reference variation amount to generate a calculated vehicle weight when the estimated variation amount exceeds the reference variation amount, and estimating the final vehicle weight based on the calculated vehicle weight.

Such a technology, which is applied to a hybrid vehicle, has a limitation in application to an electric vehicle. In addition, the accuracy of the technology is deteriorated since the weight of the vehicle is estimated using the longitudinal acceleration of the vehicle without considering the output of the vehicle, and the vehicle additionally requires an acceleration measurement device.

SUMMARY

The present disclosure provides an apparatus for controlling a towing mode of an electric vehicle that estimates a towing weight based on a difference between a reference output of the vehicle and a current output of the vehicle corresponding to a speed and a gradient of the vehicle, and executes the towing mode based on the estimated towing weight, and a method thereof. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a towing mode of an electric vehicle may include a first sensor configured to measure a speed of the electric vehicle, a second sensor configured to measure a gradient of a road on which the electric vehicle is driven, and a controller configured to detect a reference output of the electric vehicle based on the speed and the gradient of the road, detect a towing weight of the electric vehicle based on an excess rate of a current output with respect to the reference output, and execute the towing mode of the electric vehicle based on the detected towing weight.

The apparatus may further include a storage configured to have a first table in which the reference output of the electric vehicle corresponding to the speed of the electric vehicle and the gradient of the mad is stored. In addition, the storage may be configured to store a second table in which the towing weight corresponding to the excess rate (%) of the current output with respect to the reference output of the electric vehicle is stored. The controller may be configured to determine whether a trailer is connected to the vehicle based on the detected towing weight. The controller may then be configured to provide the detected towing weight to a vehicle controller, which is a host controller, to operate the vehicle controller in the towing mode.

The vehicle controller may be configured to determine an amount of regenerative braking in the towing mode based on the towing weight provided from the controller. The vehicle controller may then be configured to reduce an acceleration force in the towing mode based on the towing weight provided from the controller. Additionally, the vehicle controller may be configured to calculate a distance-to-empty (DTE) in the towing mode based on the towing weight provided from the controller. The vehicle controller may be configured to adjust a battery temperature in the towing mode based on the towing weight provided from the controller. In particular, the vehicle controller may be configured to reduce a reference temperature for cooling a battery based on the towing weight, and determine a time point when the battery temperature starts to increase based on the towing weight.

According to an aspect of the present disclosure, a method of controlling a towing mode of an electric vehicle may include measuring, by a first sensor, a speed of the electric vehicle, measuring, by a second sensor, a gradient of a road on which the electric vehicle is driven, detecting, by a controller, a reference output of the electric vehicle based on the speed and the gradient of the road, detecting, by the controller, a towing weight of the electric vehicle based on an excess rate of a current output with respect to the reference output, and executing, by the controller, the towing mode of the electric vehicle based on the detected towing weight.

The method may further include storing, by a storage, a first table in which the reference output of the electric vehicle corresponding to the speed of the electric vehicle and the gradient of the mad is recorded and a second table in which the towing weight corresponding to the excess rate (%) of the current output with respect to the reference output of the electric vehicle is recorded. The executing of the towing mode may include determining whether a trailer is connected to the vehicle based on the detected towing weight.

Additionally, the executing of the towing mode may include providing the detected towing weight to a vehicle controller, which is a host controller, to operate the vehicle controller in the towing mode. In particular, the method may further include determining, by the vehicle controller, an amount of regenerative braking in the towing mode based on the towing weight provided from the controller, reducing, by the vehicle controller, an acceleration force in the towing mode, calculating, by the vehicle controller, a distance-to-empty (DTE) in the towing mode, reducing, by the vehicle controller, a reference temperature for cooling a battery, or determining, by the vehicle controller, a time point when a battery temperature starts to increase.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
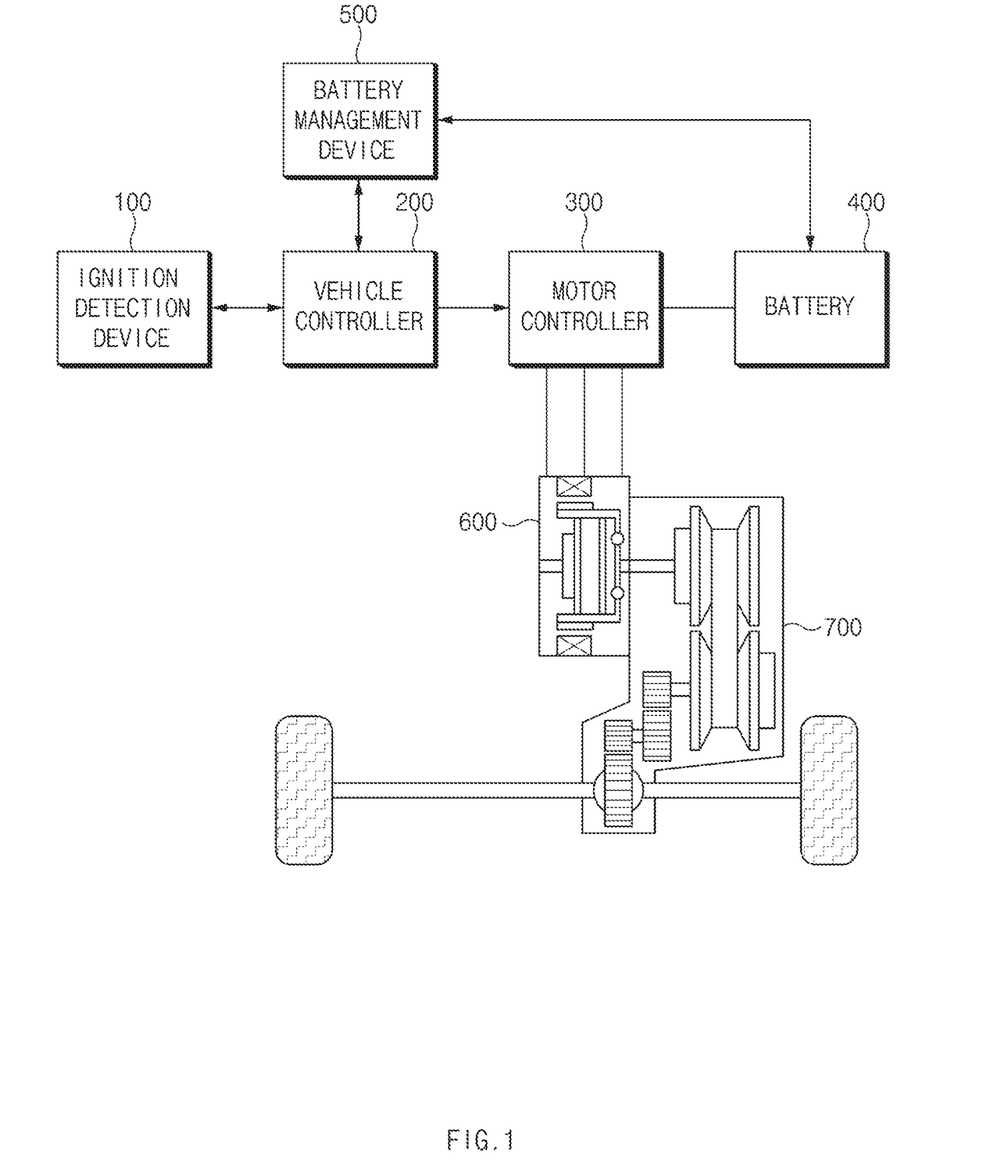
FIG. 1 is a view illustrating a schematic structure of an electric vehicle to which an exemplary embodiment of the present disclosure is applied.

FIG. 1 is a view illustrating a schematic structure of an electric vehicle to which an exemplary embodiment of the present disclosure is applied. As shown in FIG. 1, an electric vehicle to which the present disclosure is applied may include an ignition detection device 100, a vehicle controller 200, a motor controller 300, a battery 400, a battery management device 500, a motor 600, and a transmission 700.

The ignition detection device 100 may be configured to detect an ignition on/off signal (e.g., driver input related to ignition on/off) and provide the ignition on/off signal to the vehicle controller 200. The vehicle controller 200, which is a host controller, connects the motor controller 300 and the battery management device 500 via a network to integrally operate all the controllers corresponding to the driving demand of the driver and the vehicle state, thereby driving of the electric vehicle. In addition, the vehicle controller 200 may further be configured to perform a towing mode control function according to an exemplary embodiment of the present disclosure.

The motor controller 300 may include an inverter (not shown) having a plurality of power switching elements. The motor controller 300 may be configured to convert a direct current (DC) voltage of the battery 400 to a three-phase alternating current (AC) voltage corresponding to a control signal provided through the network from the vehicle controller 200 to drive the motor 600. In particular, the power switching element may include one of an insulated gate bipolar transistor (IGBT), a MOSFET, a transistor, and a relay. In addition, the motor controller 300 may be configured to adjust the output torque and speed of the motor 600 based on information provided from the vehicle controller 200 to execute optimal driving. The battery 400 may include a plurality of unit cells and may be configured to store a high voltage for providing a driving voltage to the motor 600. The battery 400 may be charged with a voltage generated from the motor 600 during regenerative braking.

In addition, the battery 400 may be charged with a voltage and a current supplied through a charging device (not shown) when a commercial power source is plugged in. Particularly, the battery 400 may include a temperature sensor (not shown) configured to detect a temperature, a temperature increasing device (not shown) configured to heat the battery 400, and a cooling device (not shown) configured to cool the battery 400. The battery management device 500 may be configured to manage the SOC of the battery 400 and perform cell balancing by detecting the current and voltage of each cell in the operating range of the battery 400. In addition, the battery management device 500 may be configured to adjust the charging/discharging voltage of the battery 400 to prevent the battery 400 from decreasing to below a threshold voltage or being overcharged beyond a threshold voltage, thereby preventing the durability from decreasing.

The battery management device 500 may also be configured to determine that the battery 400 is under the output performance reduction condition when the temperature of the battery 400 detected by the temperature sensor is equal to or less than a set reference temperature when the ignition on is detected. The battery management device 500 may then be configured to operate the temperature increasing device to increase the temperature of the battery 400, thereby providing stable output performance of the battery 400, and variably change a temperature increasing target temperature corresponding to the SOC and the output performance of the battery 400. In particular, the battery management device 500 may be configured to operate the cooling device to prevent the temperature of the battery 400 from exceeding the reference value.

Further, the battery management device 500 may be configured to detect the amount of change in the output of the battery 400 in the process of increasing the temperature of the battery 400 due to the operation of the temperature increasing device, and determine the completion of the temperature increasing when the output is decreased, thereby turning off the temperature increasing device. In addition, the battery management device 500 may be configured to detect the output of the battery 400 in the process of increasing the temperature of the battery 400 due to the operation of the temperature increasing device, and determine the completion of the temperature increasing in response to determining as the map-based maximum output with respect to the current SOC, thereby turning off the temperature raising device.

The motor 600 may be operated by the three-phase AC voltage applied from the motor controller 300 to generate a driving force, and may be operated as a generator when braking to supply regenerative energy to the battery 400. The transmission 700 may be connected to the output shaft of the motor 600 and may be configured to output a driving force to driving wheels under control of the transmission controller (not shown) by adjusting the speed ratio corresponding to driving conditions of the electric vehicle. In particular, the transmission 700 may be implemented with an automatic transmission or a continuously variable transmission.

Meanwhile, the vehicle controller 200 may be configured to perform various controls required in the temperature increasing process of the battery 400. In other words, the vehicle controller 200 may be configured to determine whether an ignition on is detected by the ignition detection device 100 in a standby state of the electric vehicle. When the ignition on is detected, the vehicle controller 200 may be configured to provide or transmit the ignition on information to the battery management device 500 via a network. The battery management device 500 may be configured to determine whether the temperature of the battery 400 detected by the temperature sensor included in the battery 400 is equal to or less than the set reference temperature. In particular, the set reference temperature, which is a condition for determining degradation of the output performance of the battery 400, may be set, for example, in the temperature range of about $-5°$ C. to $0°$ C., and may be changed based on the designer and the environment of the operation region.

When the temperature of the battery 400 is equal to or less than the set reference temperature, the battery management device 500 may be configured to determine the set reference temperature as the output performance degradation condition of the battery 400, and operate a temperature increasing device provided in the battery 400 to increase the temperature of the battery 400. As the temperature of the battery 400 increases, the output performance of the battery 400 increases, and a voltage loss occurs in the battery 400 due to the operation of the temperature increasing device, and thus, the SOC of the battery 400 is decreased. Accordingly, the battery management device 500 may be configured to detect a change in output of the battery 400 and determine whether the output of the battery 400 is reduced.

In response to determining that the output of the battery 400 is decreased, the battery management device 500 may be configured to determine that the operation of increasing the temperature of the battery 400 is completed and turn off the temperature increasing device. Thus, it may be possible to prevent the occurrence of voltage loss of the battery 400 due to unnecessary operation of the temperature increasing device, thereby providing an optimal driving distance and output performance corresponding to the SOC.

Furthermore, the vehicle controller 200 may be configured to perform various controls required in the regenerative braking operation of the brake controller. When the driver engages the brake pedal and the braking intention is input to the brake controller, the brake controller may be configured to receive the stroke amount (e.g., pressure amount) sensed by the sensor and calculate a driver request braking force based on the stroke amount.

After the initial hydraulic braking is performed corresponding to the driver request braking force, the total braking force may be distributed to the hydraulic braking force and the regenerative braking force to perform the regenerative braking at the maximum. In the distribution operation, the brake controller may be configured to calculate an allowable amount of regenerative braking torque based on the driver request braking force, and transmit the allowable amount to the vehicle controller 200 which is a host controller. Thus, the vehicle controller 200 may be configured to determine whether to perform the regenerative braking and the regenerative braking torque to be generated from the motor 600 based on information (e.g., shift lever position information and the like) regarding the transmission controller (TCU), information (e.g., battery state information and the like) regarding the battery management device 500, and information regarding the allowable amount of regenerative braking torque transmitted from the brake controller, and the like.

The motor controller 300 may be configured to adjust the regenerative braking torque of the motor corresponding to a torque command of the vehicle controller 200 (e.g., regenerative braking torque generated from the motor), and the vehicle controller 200 may be configured to transmit the actually generated amount of the motor torque to the brake controller. In addition, the brake controller may be configured to determine the hydraulic braking force with reference to the actually generated amount of the motor torque, and adjust the hydraulic pressure of the hydraulic braking device to generate the required hydraulic braking force.

Figure 2:
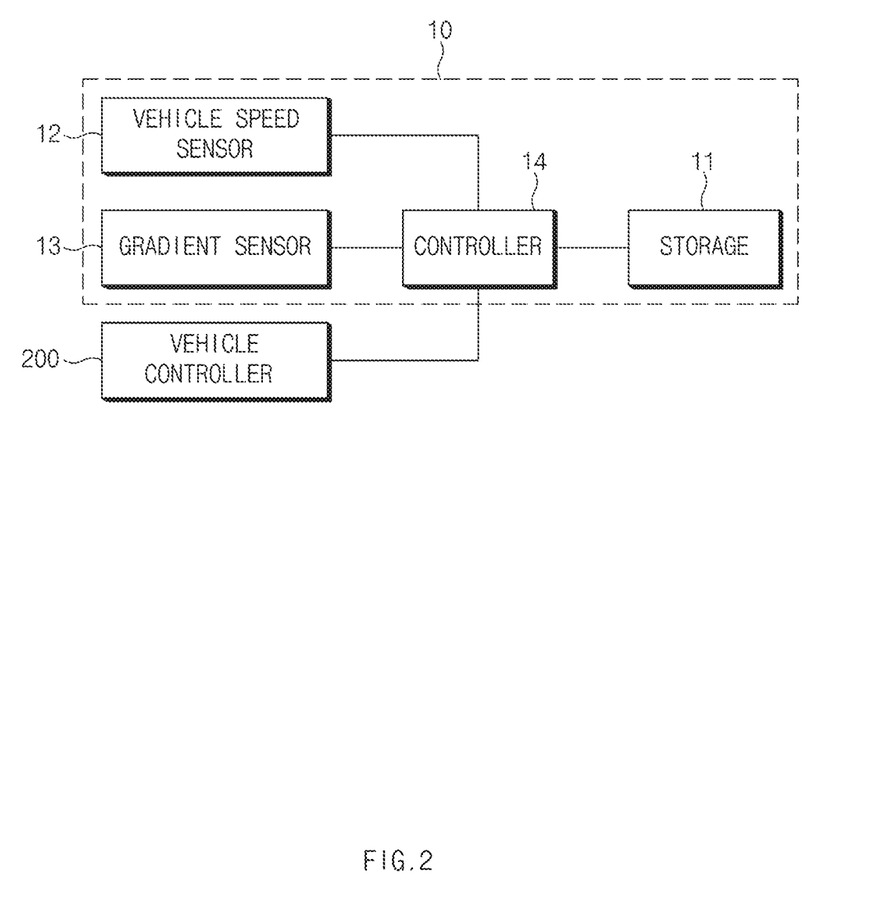
FIG. 2 is a view illustrating a configuration of an apparatus for controlling a towing mode of an electric vehicle according to an exemplary embodiment of the present disclosure.

FIG. 2 is a view illustrating a configuration of an apparatus for controlling a towing mode of an electric vehicle according to an exemplary embodiment of the present disclosure. As illustrated in FIG. 2, an apparatus 10 for controlling a towing mode of an electric vehicle according to an exemplary embodiment of the present disclosure may include a storage 11 or memory, a vehicle speed sensor 12, a gradient sensor 13, and a controller 14. In particular, depending on a scheme of operating the apparatus for controlling a towing mode of an electric vehicle according to an exemplary embodiment of the present disclosure, the components may be combined into one unit. In addition, some of the components may be omitted depending on such a manner of implementing an exemplary embodiment of the present disclosure.

Referring to the respective components, first, the storage 11 may include a first table in which a reference output of an electric vehicle corresponding to a vehicle speed (e.g., a speed of the electric vehicle) and a gradient of a road on which the vehicle is being driven is recorded. The first table may vary based on the type and the specification of the electric vehicle, for example, as shown in FIG. 3.

Figure 3:
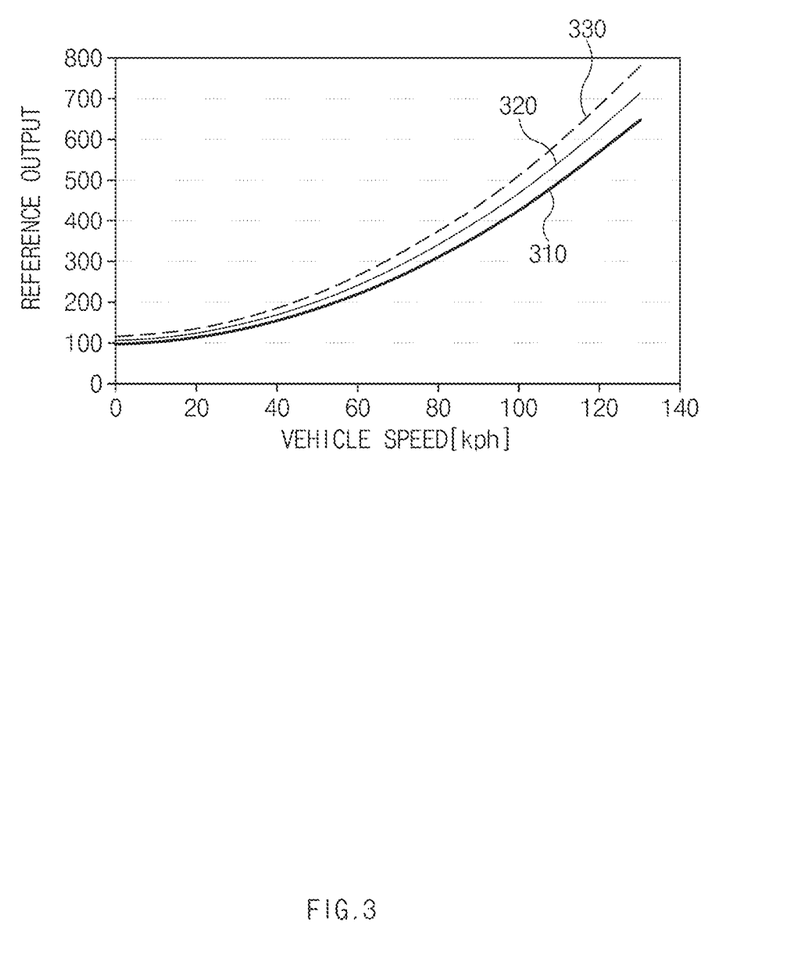
FIG. 3 is a view illustrating a reference output corresponding to a vehicle speed and a gradient according to an exemplary embodiment of the present disclosure.

In FIG. 3, the horizontal axis represents a vehicle speed (kph), and the vertical axis represents a reference output (W) of the electric vehicle. In addition, reference numeral '310' denotes a graph showing a reference output with respect to a vehicle speed when the gradient of the road is 0%, reference numeral '320' denotes a graph showing a reference output with respect to a vehicle speed when the gradient of the road is 5%, and reference numeral '330' denotes a graph showing a reference output with respect to a vehicle speed when the gradient of the road is 10%.

In an exemplary embodiment of the present disclosure, three slope graphs are exemplified, but the number of slope graphs may be increased or decreased by the intention of the designer, which does not affect the exemplary embodiments of the present disclosure. In addition, the storage 11 may further be configured to store a second table in which a towing weight corresponding to an excess rate (%) of a current output to a reference output of the electric vehicle is recorded. In particular, the towing weight refers to the weight (including a load amount) of a trailer. One example of the second table is shown in following Table 1.

TABLE 1

| Excess rate (%) | Towing weight (kg) |
| --- | --- |
| 5 or less | 0 |
| More than 5 to 10 or less | 400 |
| More than 10 to less than 15 | 425 |
| More than 15 to 20 or less | 450 |
| More than 20 to 25 or less | 475 |
| More than 25 to 30 or less | 500 |
| More than 30 to 35 or less | 525 |
| More than 35 to 40 or less | 550 |
| More than 40 to 45 or less | 575 |
| More than 45 to 50 or less | 600 |

For example, when the reference output is 500 and the current output is 600, the towing weight is 450 kg since the excess rate is 20%. In other words, the total weight, which is the sum of the weight of the trailer connected to the electric vehicle and the load of the trailer, is 450 kg. In addition, the storage 11 may include at least one type of a storage medium of memories of a flash memory type, a hard disk type, a micro type, a card type (e.g., a secure digital (SD) card or an extreme digital (XD) card), and the like and a random access memory (RAM), a read-only memory (ROM), a programmable ROM (PROM), an electrically erasable PROM (EEPROM), a magnetic disk, and an optical disk type memory.

Moreover, the vehicle speed sensor 12, which is a first sensor, may be configured to measure or detect the speed of the electric vehicle. The gradient sensor 13, which is a second sensor, may be configured to measure the gradient of the road on which the electric vehicle is being driven. Both of the sensed speed and gradient may then be transmitted to the controller. The controller 14 may be configured to execute overall control such that the components perform respective functions. The controller 14 may be implemented in the form of hardware or software, or may be a combination of hardware and software. For example, the controller 14 may be implemented with a microprocessor, but is not limited thereto.

Further, the controller 14 may be configured to estimate the towing weight based on the difference between the reference output of the vehicle and the current output of the vehicle corresponding to the speed of the vehicle and the gradient, and execute the towing mode based on the estimated towing weight. In addition, based on the first table stored in the storage 11, the controller 14 may be configured to detect the reference output corresponding to the vehicle speed measured by the vehicle speed sensor 12 and the gradient of the road measured by the gradient sensor 13. Based on the second table stored in the storage 11, the controller 14 may be configured to determine whether the trailer is connected to the vehicle based on the towing weight that corresponds to the excess rate of the current output to the detected reference output (e.g., whether the towing mode is activated).

Additionally, based on the second table stored in the storage 11, the controller 14 may be configured to detect the towing weight that corresponds to the excess rate of the current output to the detected reference output. The controller 14 may then be configured to provide or transmit the detected towing weight to the vehicle controller 200 to operate the vehicle controller 200 to execute the towing mode (e.g., towing mode activation). For example, the towing mode may be as follows.

1) Regenerative Braking Control in Towing Mode

Figure 4:
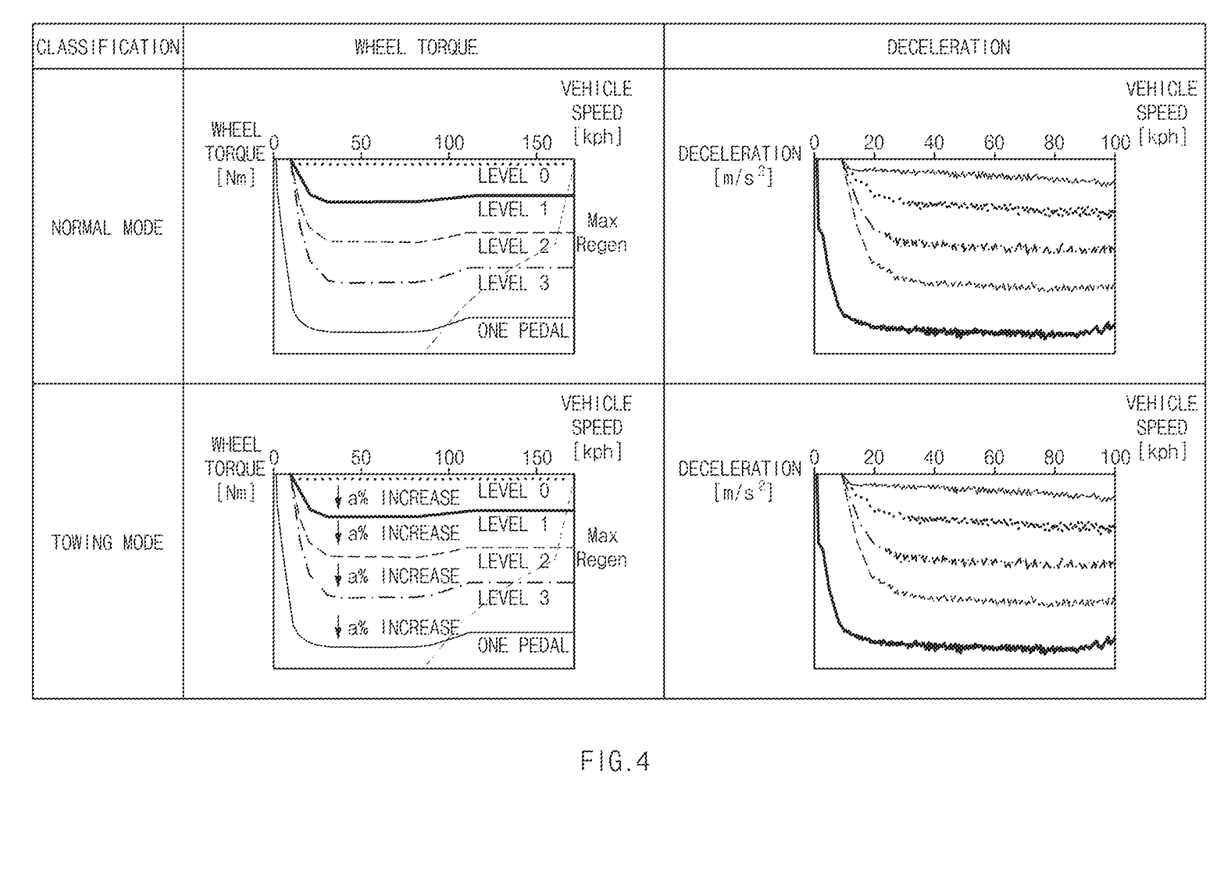
FIG. 4 is a view illustrating wheel torque and deceleration in the towing mode during regenerative braking according to an exemplary embodiment of the present disclosure.

The maximum regenerative braking amount of the electric vehicle may be set at the maximum deceleration rate at which the hydraulic pressure may be compensated in an emergency situation. In the towing mode, the deceleration may be reduced since the weight is increased compared to the normal mode. Particularly, when the regenerative braking amount becomes greater than the allowable maximum deceleration, the hydraulic pressure may be compensated later, and thus, a collision accident may occur.

Therefore, the vehicle controller 200 may be configured to determine the regenerative torque amount of the motor 600 based on the maximum deceleration allowed by the brake in the towing mode. In other words, the vehicle controller 200 may be configured to reduce the regenerative torque amount of the motor 600 based on the towing weight. As shown in FIG. 4, the vehicle controller 200 may be configured to increase the wheel torque in the towing mode compared to the normal mode, thereby maintaining the deceleration constant. The vehicle controller 200 may be configured to determine the regenerative braking amount 'B' in the towing mode based on, for example, following Equation 1.

$$B = A \times TW \times F1 \qquad \text{Equation 1}$$

wherein the 'A' represents the regenerative braking amount in the normal mode, the 'TW' represents the towing weight, and the 'F' is a constant as a correction factor.

2) Response Control in Towing Mode

Figure 5:
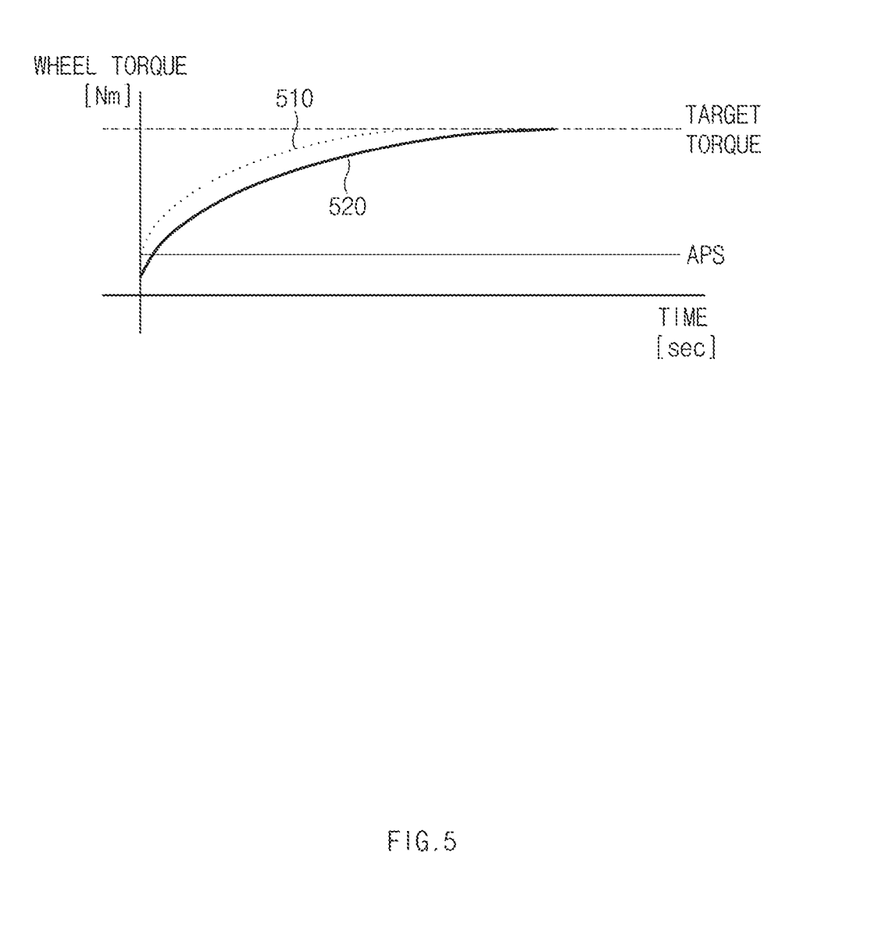
FIG. 5 is a view illustrating wheel torque at start in the towing mode according to an exemplary embodiment of the present disclosure.

The electric vehicle has rapid responsiveness (acceleration ability) at the start. Due to such responsiveness, a shock is generated in the electric vehicle in the towing mode. Thus, as shown in FIG. 5, the vehicle controller 200 may be configured to reduce the responsiveness of the electric vehicle to prevent a shock from occurring in the towing mode. In FIG. 5, in a state where an accelerator position sensor (APS) senses the depression of the accelerator pedal, reference numeral '510' indicates a wheel torque in the normal mode and reference numeral '520' indicates a wheel torque in the towing mode. The vehicle controller 200 may be configured to determine the wheel torque 'T' in the towing mode based on, for example, following Equation 2.

$$T = T1 \times TW \times F2 \qquad \text{Equation 2}$$

wherein the 'T1' represents the wheel torque in the normal mode, the 'TW' represents the towing weight, and the 'F2' is a constant as a correction factor.

3) Distance to Empty (DTE) Calculation in Towing Mode

There is a difference between the DTE in the normal mode and the DTE in the towing mode. Therefore, the vehicle controller 200 may be configured to stop DTE learning in the normal mode, and calculate the DTE in the towing mode based on following Equation 3.

$$D = \frac{E}{FE} \times TW \times F3 \qquad \text{Equation 3}$$

wherein the 'D' represents the DTE in the towing mode, the 'E' represents the remaining energy of the battery, the 'FE' represents the initial fuel efficiency in the towing mode, the 'TW' represents the towing weight, and the 'F3' is a constant as a correction factor. In particular, when the initial fuel efficiency is greater than the previous learning fuel efficiency (fuel efficiency in the normal mode), the correction factor is less than '1'. When the initial fuel efficiency is less than the previous learning fuel efficiency, the correction factor is greater than '1'.

4) Control of Battery 400 temperature in Towing Mode

The management of the battery 400 of the electric vehicle includes a cooling process and a temperature increase process to maintain a constant temperature. In the towing mode, the battery 400 generates more heat than in the normal mode since more energy is used in the towing mode than in the normal mode. Thus, the vehicle controller 200 may be configured to reduce the reference temperature for cooling the battery 400 based on the towing weight. The vehicle controller 200 may be configured to determine the reference temperature 'T' for cooling the battery 400 based on following Equation 4.

$$T = T1 - (TW \times F4) \qquad \text{Equation 4}$$

wherein the 'T1' represents a reference temperature, the 'TW' represents a towing weight, and the 'F4' is a constant as a correction factor.

Since a greater amount of energy of the battery 400 is used the towing mode than in the normal mode, the minimum voltage protection logic of the battery may operate in a low temperature region having a high resistance. Therefore, the vehicle controller 200 may be configured to determine the temperature increase starting point based on following Equations 5 and 6.

$$P = P1 - (TW \times F5) \qquad \text{Equation 5}$$

wherein the 'P' represents an output for starting the temperature rise of the battery 400 in the towing mode, the 'P1' represents an output for starting the temperature rise of the battery 400 in the normal mode, the 'TW' represents a towing weight, and the 'F5' is a constant as a correction factor.

$$Te = Te1 - (TW \times F6) \qquad \text{Equation 6}$$

wherein the 'Te' represents a temperature for starting the temperature rise of the battery 400 in the towing mode, the 'Te1' represents a temperature for starting the temperature rise of the battery 400 in the normal mode, the 'TW' represents a towing weight, and the 'F6' is a constant as a correction factor.

Figure 6:
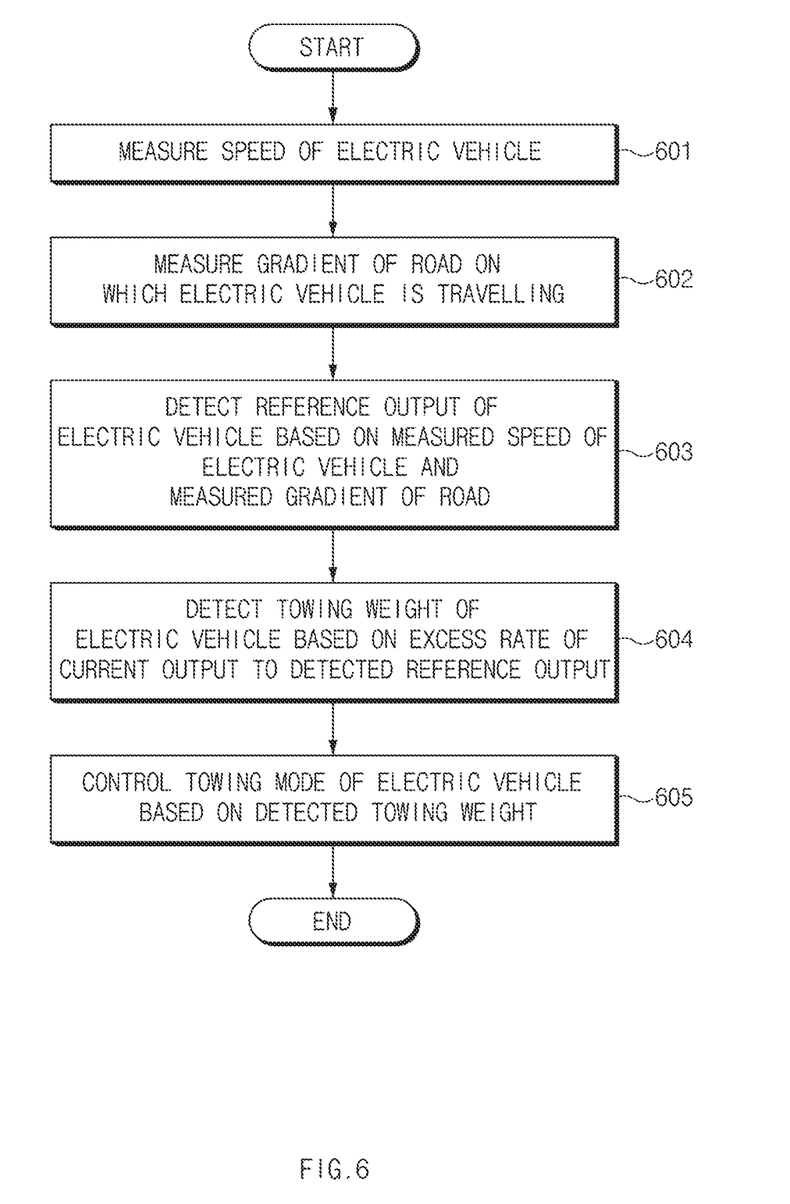
FIG. 6 is a flowchart of a towing mode control method for an electric vehicle according to an exemplary embodiment of the present disclosure.

FIG. 6 is a flowchart of a towing mode control method for an electric vehicle according to an exemplary embodiment of the present disclosure. First, in 601, the first sensor 12 may be configured to measure the speed of the electric vehicle. In addition, in 602, the second sensor 13 may be configured to measure the gradient of the road on which the electric vehicle is being driven. Thereafter, in 603, the controller 14 may be configured to detect the reference output of the electric vehicle based on the measured speed of the electric vehicle and the measured gradient of the road. In particular, the controller 14 may be configured to detect the reference output of the electric vehicle using the first table in which the reference output of the electric vehicle corresponding to the speed of the electric vehicle and the gradient of the road is recorded.

Thereafter, in 604, the controller 14 may be configured to detect the towing weight of the electric vehicle based on the exceeded rate of the current output to the detected reference output. Particularly, the controller 14 may be configured to detect the towing weight of the electric vehicle using the second table in which the towing weight corresponding to the excess rate (%) of the current output relative to the reference output of the electric vehicle is recorded. Thereafter, in 605, the controller 14 may be configured to execute the towing mode of the electric vehicle based on the detected towing weight. In particular, the controller 14 may be configured to directly perform the regenerative braking control in the towing mode, the response control in the towing mode, the DTE calculation in the towing mode, the temperature control of the battery 400 in the towing mode, or may be performed interworking with the vehicle controller 200 which is a host controller.

Figure 7:
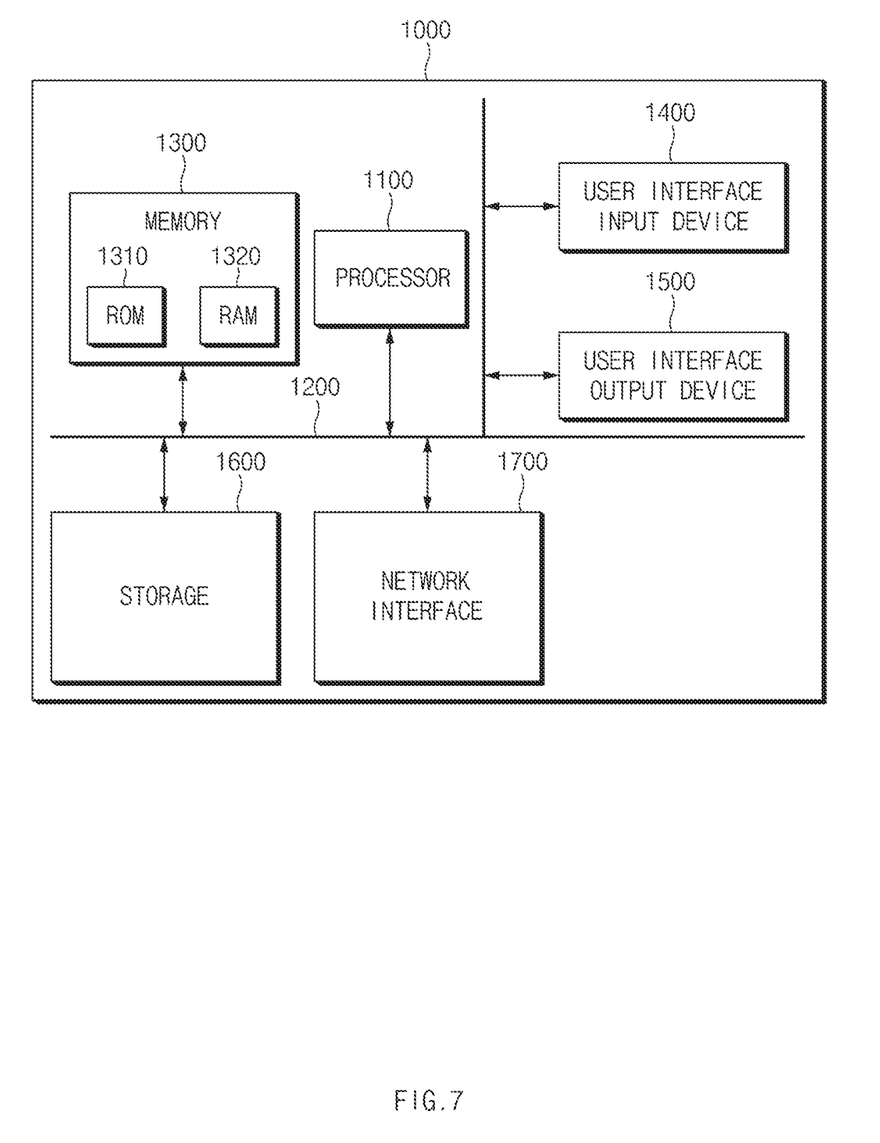
FIG. 7 is a block diagram illustrating a computing system for executing a method of controlling a towing mode of an electric vehicle according to an exemplary embodiment of the present disclosure.

FIG. 7 is a block diagram illustrating a computing system for executing a method of controlling a towing mode of an electric vehicle according to an exemplary embodiment of the present disclosure. Referring to FIG. 7, a computing system 1000 may include at least one processor 1100, a memory 1300, a user interface input device 1400, a user interface output device 1500, storage 1600, and a network interface 1700, which are connected with each other via a bus 1200. The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the apparatus and method for controlling a towing mode of an electric vehicle of the present disclosure, it may be possible to estimate a towing weight based on a difference between a reference output of the vehicle and a current output of the vehicle corresponding to a speed and a gradient of the vehicle and to execute the towing mode based on the estimated towing weight.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a towing mode of an electric vehicle, comprising:
   a first sensor configured to measure a speed of the electric vehicle;
   a second sensor configured to measure a gradient of a road on which the electric vehicle is driven; and
   a controller configured to:
      detect a reference output power of the electric vehicle based on the speed and the gradient of the road;
      detect a towing weight of the electric vehicle based on an excess rate of a current output power with respect to the reference output power; and
      execute the towing mode of the electric vehicle based on the detected towing weight,
   wherein the controller is configured to provide the detected towing weight to a vehicle controller, which is a host controller, to operate the vehicle controller in the towing mode, and
   wherein the vehicle controller is configured to adjust a battery temperature in the towing mode based on the towing weight provided from the controller.

2. The apparatus of claim 1, further comprising:
   a storage configured to have a first table in which the reference output of the electric vehicle corresponding to the speed of the electric vehicle and the gradient of the road is recorded.

3. The apparatus of claim 2, wherein the storage is configured to further store a second table in which the towing weight corresponding to the excess rate of the current output power compared to the reference output power of the electric vehicle is recorded.

4. The apparatus of claim 1, wherein the controller is configured to determine whether a trailer is connected to electric vehicle based on the detected towing weight.

5. The apparatus of claim 1, wherein the vehicle controller is configured to determine an amount of regenerative braking in the towing mode based on the towing weight provided from the controller.

6. The apparatus of claim 1, wherein the vehicle controller is configured to reduce an acceleration force in the towing mode based on the towing weight provided from the controller.

7. The apparatus of claim 1, wherein the vehicle controller is configured to calculate a distance-to-empty (DTE) in the towing mode based on the towing weight provided from the controller.

8. The apparatus of claim 1, wherein the vehicle controller is configured to reduce a reference temperature for cooling a battery based on the towing weight.

9. The apparatus of claim 1, wherein the vehicle controller is configured to determine a time point when the battery temperature starts to increase based on the towing weight.

10. A method of controlling a towing mode of an electric vehicle, comprising:
- receiving, by a controller, a speed of the electric vehicle measured by a first sensor and a gradient of a road on which the electric vehicle is driven measured by a second sensor;
- detecting, by the controller, a reference output power of the electric vehicle based on the speed and the gradient of the road;
- detecting, by the controller, a towing weight of the electric vehicle based on an excess rate of a current output power with respect to the reference output power; and
- executing, by the controller, the towing mode of the electric vehicle based on the detected towing weight, wherein the executing of the towing mode includes:
- providing, by the controller, the detected towing weight to a vehicle controller, which is a host controller, to operate the vehicle controller in the towing mode,
- reducing, by the vehicle controller, a reference temperature for cooling a battery based on the towing weight provided from the controller.

11. The method of claim 10, further comprising:
- storing, by the controller, in a storage, a first table in which the reference output power of the electric vehicle corresponding to the speed of the electric vehicle and the gradient of the road is recorded and a second table in which the towing weight corresponding to the excess rate of the current output power compared to the reference output power of the electric vehicle is recorded.

12. The method of claim 10, wherein the executing of the towing mode includes:
- determining, by the controller, whether a trailer is connected to the electric vehicle based on the detected towing weight.

13. The method of claim 10, further comprising:
- determining, by the vehicle controller, an amount of regenerative braking in the towing mode based on the towing weight provided from the controller.

14. The method of claim 10, further comprising:
- reducing, by the vehicle controller, an acceleration force in the towing mode based on the towing weight provided from the controller.

15. The method of claim 10, further comprising:
- calculating, by the vehicle controller, a distance-to-empty (DTE) in the towing based on the towing weight provided from the controller.

16. The method of claim 10, further comprising:
- determining, by the vehicle controller, a time point when a battery temperature starts to increase based on the towing weight.

\* \* \* \* \*